(No Model.)
N. B. BARBEE.
HAND FERTILIZER DISTRIBUTER.
No. 466,996. Patented Jan. 12, 1892.
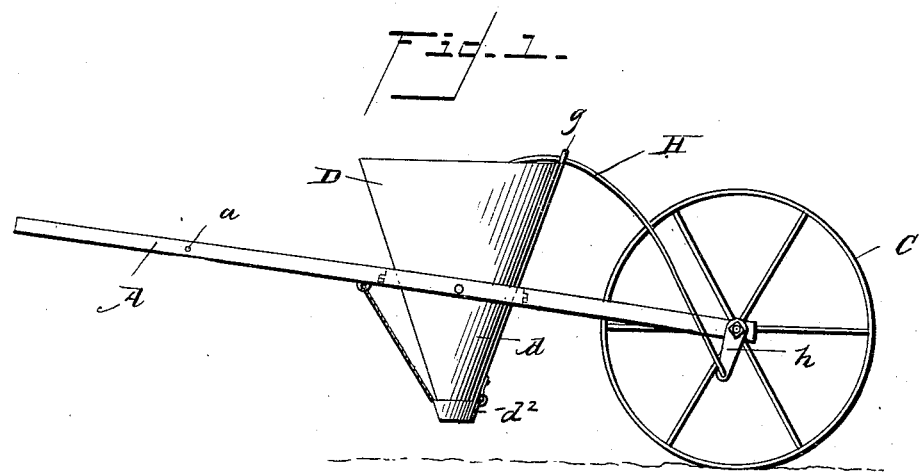
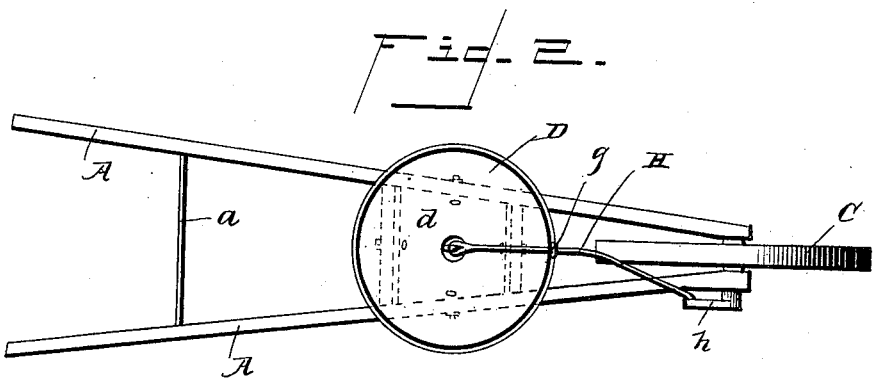
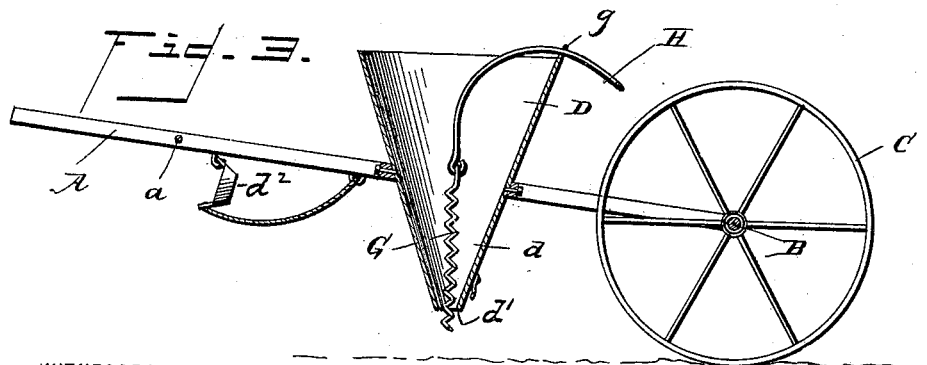
WITNESSES:
Samuel Ker,
Philip O. Masi.
INVENTOR
N. B. Barbee,
BY E.W. Anderson
his ATTORNEY.

UNITED STATES PATENT OFFICE.

NAPOLEON B. BARBEE, OF CROCKETT, TEXAS.

HAND FERTILIZER-DISTRIBUTER.

SPECIFICATION forming part of Letters Patent No. 466,996, dated January 12, 1892.

Application filed June 30, 1891. Serial No. 398,033. (No model.)

*To all whom it may concern:*

Be it known that I, NAPOLEON B. BARBEE, a citizen of the United States, and a resident of Crockett, in the county of Houston and State of Texas, have invented certain new and useful Improvements in Hand Fertilizer-Distributers; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a side elevation. Fig. 2 is a top plan view. Fig. 3 is a vertical section.

This invention has relation to certain new and useful improvements in hand fertilizer-distributers and seed-drills; and it consists in the novel construction and combination of parts, as hereinafter specified.

In the accompanying drawings, illustrating the invention, the letters A A represent two suitable handles approaching to within a short distance of each other at their forward ends and diverging as they extend rearwardly and connected by the transverse braces $a$. Rigidly mounted on a short shaft B, having bearings in the handles A A near their forward ends and between said handles, is the ground-wheel C.

D represents a hopper supported between the handles at the rear of the wheel C and provided with the conical or funnel-shaped discharge $d$.

On one end of the shaft B is a crank or eccentric $h$, to which is connected one end of a curved pitman or rod H, which extends upwardly and rearwardly to the hopper D, passing through a guide ring or eye $g$ on the forward edge thereof and terminating a little below the center of said hopper, where it is connected to an agitating screw rod or worm G, the lower end of which extends below the discharge-opening at the bottom. As the wheel is run along in the furrow or where desired the revolution of the shaft B and the crank or eccentric carried thereby will reciprocate the pitman or rod H and thereby the agitating or vertically-reciprocal rod G in the mouth of the funnel-shaped discharge, which will keep the fertilizer or seed in constant motion in the hopper and cause its constant discharge through the opening $d$. A suitable cover may be hinged to the hopper, if desired, to prevent the fertilizer or seed from being blown out by the wind.

When it is desired to move the machine, there being seed or fertilizer in the hopper, without causing the discharge of said seed or fertilizer said pitman may be disconnected from the screw and a small cap $d^2$ placed on the lower end of the discharge. This cap $d^2$ may be suspended by a small chain or cord from the frame.

Having described this invention, what I claim as new, and desire to secure by Letters Patent, is—

A fertilizer-distributer comprising the handles, the wheel having its shaft provided with bearings in said handles, the hopper supported between said handles and the rear of said wheel and having a funnel-shaped discharge, a crank or eccentric on said shaft, and a rod or pitman connected at one end to said crank and at the opposite end to an agitating-screw in said hopper, substantially as specified.

In testimony whereof I affix my signature in presence of two witnesses.

NAPOLEON B. BARBEE.

Witnesses:
JNO. BIGHTMAN,
HELEN L. WINFREE.